N. W. BAECHLE.
ADJUSTABLE DRIVER OR CARRIER FOR LATHES, &c.
APPLICATION FILED APR. 10, 1911.

1,022,118.

Patented Apr. 2, 1912.

Witnesses

Inventor
Nicholas W. Baechle,
By George B. Askins
Attorney

UNITED STATES PATENT OFFICE.

NICHOLAS W. BAECHLE, OF CINCINNATI, OHIO.

ADJUSTABLE DRIVER OR CARRIER FOR LATHES, &c.

1,022,118. Specification of Letters Patent. Patented Apr. 2, 1912.

Application filed April 10, 1911. Serial No. 619,949.

*To all whom it may concern:*

Be it known that I, NICHOLAS W. BAECHLE, a citizen of the United States, residing at Cincinnati, in the county of Hamilton and State of Ohio, have invented certain new and useful Improvements in Adjustable Drivers or Carriers for Lathes, &c., of which the following is a specification.

My invention is specifically designed for use in turning pulleys or other objects having spokes or interior lugs and requiring, for accurate work, that the driver shall contact with a plurality of spokes or interior lugs.

Owing to the want of uniformity in castings some adjustment of the driving contacts is essential in order to insure more than one contact and thereby avoid danger of springing the arbor. Drivers for this general purpose have been provided with adjustable arms but they are impractical with small pulleys and involve waste of time in making the required adjustments for larger pulleys.

The objects of my invention are to provide an adjustable driver which may be used for finishing pulleys, fly wheels, gear blanks, etc., of any size, and with which the adjustment may be made almost instantaneously; and to provide a driver in which the wear is reduced to the minimum.

Figure 1:
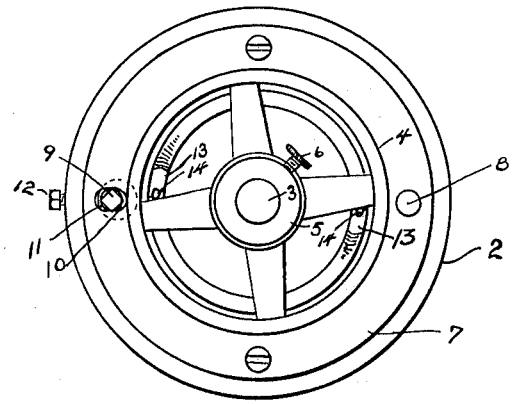
Figure 2:
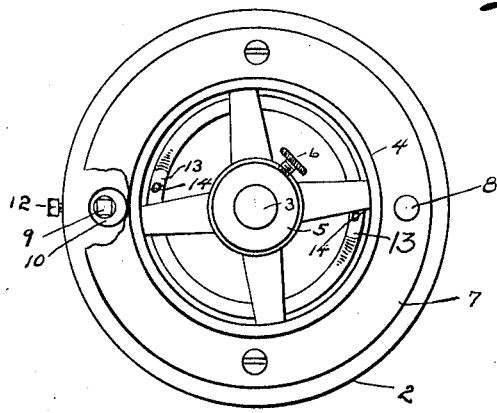
Figure 3:
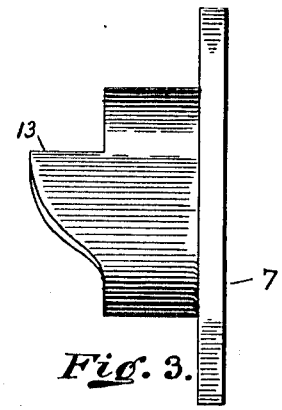
Figure 4:
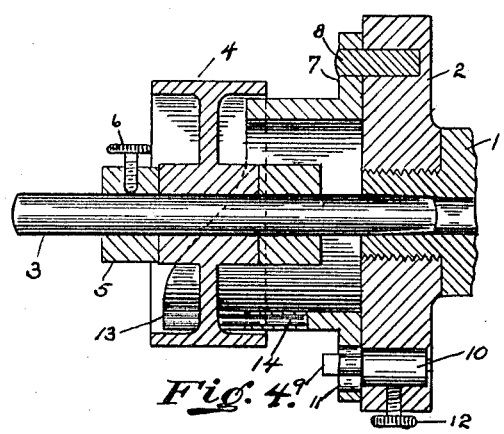

In the drawings, Figure 1 is an end view showing the driver with a pulley thereon; Fig. 2 a like view with a part broken away to show the operating mechanism; Fig. 3 a side view of the driver; and Fig. 4 a longitudinal section of the driver and pulley.

The reference numeral 1 designates the spindle of a lathe, 2 a carrying plate which may be attached to any lathe, or may be the face plate of a lathe; 3 an arbor adapted to carry a pulley 4, or other object to be turned, which may be secured against longitudinal movement thereon by a collar 5 provided with a set screw 6. The driver 7 is carried by this plate and normally secured against rotation thereon by means of a fixed pivot 8 and a square headed pin 9, eccentrically mounted upon a shaft 10 seated in the carrying plate 2, said pin taking through a slot 11 is the base of the driver. The shaft 10 may be locked in position by a set screw 12. The driver is provided with driving arms 13, preferably of angular shape in order to secure the maximum of strength and permit the arms to take into the narrow spaces between closely adjacent spokes. To guard against injurious wear, the bearing faces of the arms consist of chilled steel rods 14 partially embedded in the soft metal of which the body of the driver is composed.

In operation, the object to be turned is placed over the driver with one arm in contact with a spoke. If both arms do not contact, a turn of the eccentric pin 9 in the required direction swings the driver relatively to its carrying plate, and relatively to the axis of the arbor, and brings both arms into contact.

I claim as my invention.

1. In an adjustable driver, the combination of a carrying plate; a driver movably mounted upon the plate, having a plurality of driving arms and adapted to loosely encircle an arbor; means for moving the driver relatively to the axis of the plate; and means for securing the driver in its adjusted positions.

2. In an adjustable driver, the combination of a carrying plate; a driver having a pivotal connection with the plate and a plurality of driving arms and adapted to loosely encircle an arbor; an eccentric adapted to adjust the position of the driver relatively to the axis of the plate; and means for securing the driver in its adjusted positions.

3. In an adjustable driver, the combination of a carrying plate; a driver having a plurality of driving arms and a pivotal connection with the plate, and adapted to loosely encircle an arbor; a pin eccentrically mounted in the plate and taking through a slot in the driver whereby the position of the driver relatively to the axis of the plate may be adjusted; and means for securing the driver in its adjusted positions.

4. In an adjustable driver, the combination of a carrying plate; a driver movably mounted upon the plate, having a plurality of angular driving arms and adapted to loosely encircle an arbor; chilled steel bearing-faces carried by the arms; means for moving the driver relatively to the axis of the plate; and means for securing the driver in its adjusted positions.

NICHOLAS W. BAECHLE.

Witnesses:
W. W. SYMMES,
GEO. B. PARKINSON.

Copies of this patent may be obtained for five cents each, by addressing the "Commissioner of Patents, Washington, D. C."